(12) United States Patent
Schräder

(10) Patent No.: US 6,366,993 B1
(45) Date of Patent: Apr. 2, 2002

(54) DEPENDENCY CONTROLLER AND METHOD FOR OVERLAPPING MEMORY ACCESS OPERATIONS

(75) Inventor: Bernhard Schräder, Delbrück-Boke (DE)

(73) Assignee: Siemens Nixdorf formationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/402,061

(22) PCT Filed: Feb. 12, 1998

(86) PCT No.: PCT/DE98/00404

§ 371 Date: Sep. 27, 1999

§ 102(e) Date: Sep. 27, 1999

(87) PCT Pub. No.: WO98/43175

PCT Pub. Date: Oct. 1, 1998

(30) Foreign Application Priority Data

Mar. 26, 1997 (DE) .......................................... 197 12 799

(51) Int. Cl.[7] .............................................. G06F 12/00
(52) U.S. Cl. ............................ 711/169; 711/3; 711/158
(58) Field of Search .................................. 711/154, 3, 5, 711/158, 168–169

(56) References Cited

U.S. PATENT DOCUMENTS 5,379,379 A * 1/1995 Becker et al. ................. 711/3

FOREIGN PATENT DOCUMENTS

| EP | 0 674 273 A1 | 9/1995 |
| EP | 0 817 091 A2 | 1/1998 |
| WO | 90/00284 | 1/1990 |
| WO | WO 96/07970 | 3/1996 |

OTHER PUBLICATIONS

Computer Architecture A Quantitative Approach, Patterson, et al.

* cited by examiner

*Primary Examiner*—Do Hyun Yoo
*Assistant Examiner*—Nasser Moazzami
(74) *Attorney, Agent, or Firm*—Schiff Hardin & Waite

(57) ABSTRACT

A dependency controller and method for overlapping memory access operations whose addresses carry an identifier, in which controller the addresses which have not yet been processed are stored under the identifier and a comparison of each new address with all the stored addresses is used to produce and store a dependency vector whose bits are allocated to the identifiers and are deleted by the identifier when memory access has been completed.

7 Claims, 2 Drawing Sheets

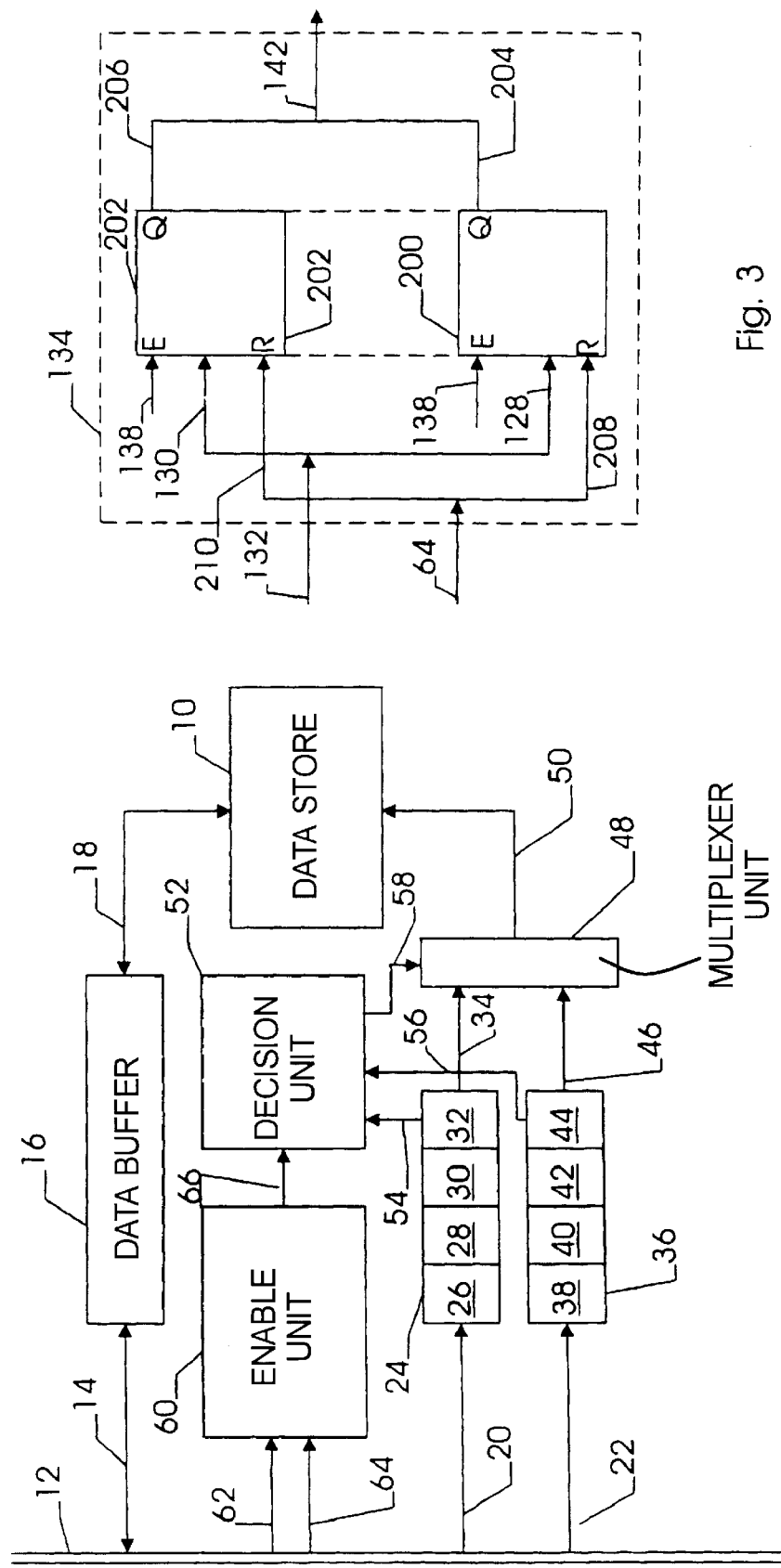

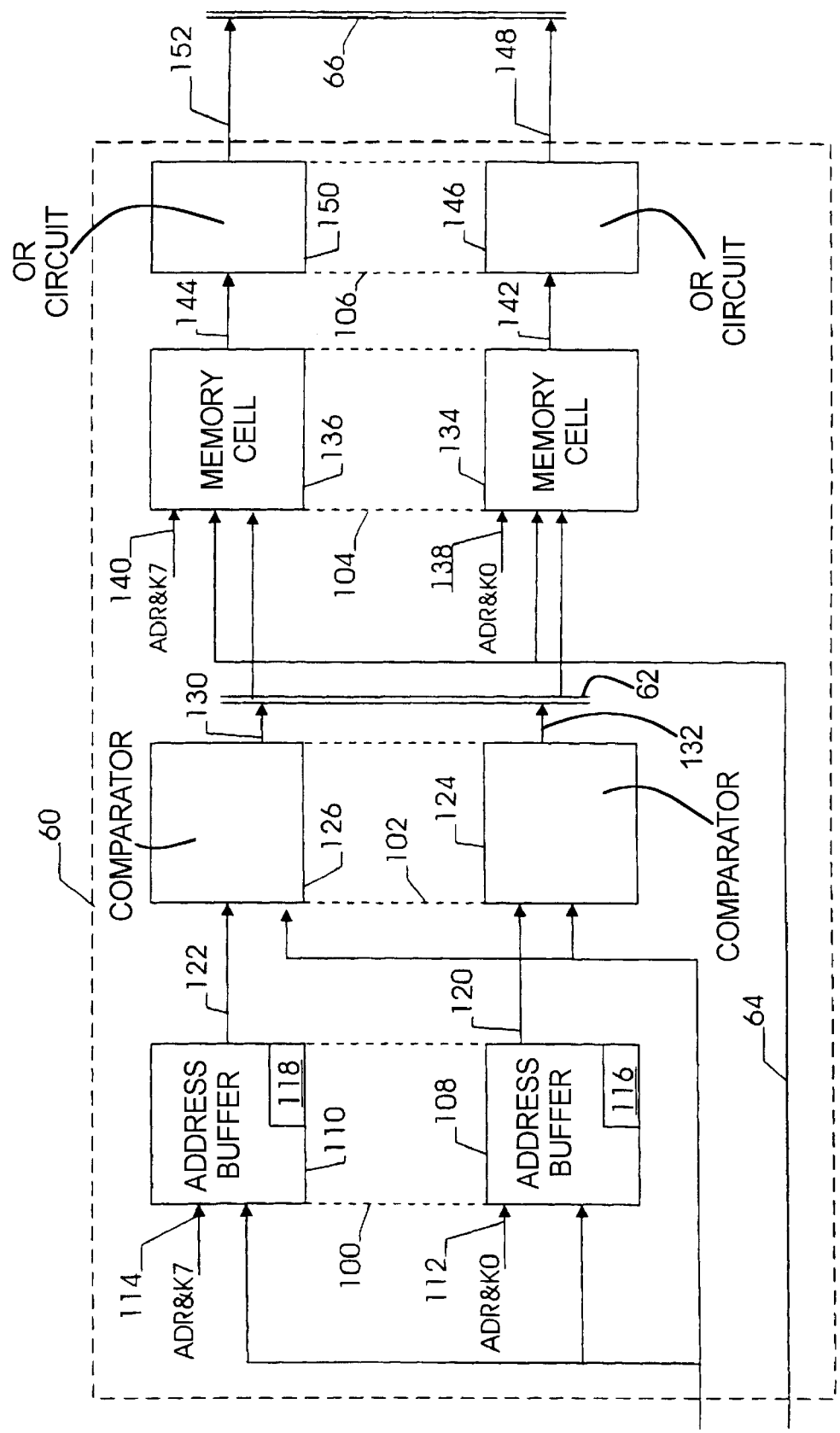

DEPENDENCY CONTROLLER AND METHOD FOR OVERLAPPING MEMORY ACCESS OPERATIONS

The present invention relates to a method and circuit for controlling access to memory cells of a data store which is accessed via a bus system with separate address and data phases.

DESCRIPTION OF THE PRIOR ART

Such known methods are used, for example, when the bus used is a so-called SP bus (split transaction bus), such as that described in the book by J. Hennessy and M. Kaufmann "Computer Architecture", 2nd edition 1996, p. 439 and pp. 728–30. In an SP bus, access operations to the data store are subdivided into a number of phases. In particular, such phases include an address phase in which the address of a memory cell is transmitted on the bus, an evaluation phase possible for examining whether the address has been transmitted correctly, and a data phase in which data is transmitted on the bus to or from the data store. Subdivision into different phases is done to prevent the bus from becoming blocked between the address being provided and the associated data being provided. The different phases are allocated a common identifier (tag) which ensures that access operations with other identifiers also can be processed simultaneously and a data transfer phase can be allocated to an address phase.

Simultaneous processing of procedures with different identifiers, however, demands that certain requirements regarding the sequence in which the different procedures are processed be met (strong ordering). For example, a read procedure which started to be processed after a write procedure should be guaranteed not to overtake this write procedure. Otherwise, this would result in an incorrect value being read from the data store.

The data stores used are preferably high-speed semiconductor random access memories (RAM). However, this does not rule out application to other write/read memories, hard disks and other storage media. The method and the circuit are preferably used in data processing units with a number of processors and a common memory, which involve simultaneous access to the same memory cell. This does not rule out application to data processing units with only one arithmetical processor, however because a bus system of this generic type can be used in one of these data processing units as well.

In previous methods, an access operation to the data store is aborted as soon as the system recognizes that the necessary sequence for processing access operations has been violated. The respective processor is informed on the bus that the access attempt has not been successful. This means that this or another processor needs to try again later to carry out the access operation.

A disadvantage of the known method is that repeated access attempts place more stringent demands on the bus than are necessary. Furthermore, additional computation time is used up in the processor when access operations are repeated.

An object of the present invention therefore is to control overlapping memory access operations such that dependencies are taken into account without aborting the memory access operations in doing so.

SUMMARY OF THE INVENTION

The present invention is based on the realization that, compared with aborting an access operation, delaying the access operation produces better results because the resultant delays are ultimately shorter and take up less computation time than repeating the access operation.

The present invention involves comparing each of the address words in an address store with an address word newly transmitted on the bus. In this respect, the selection of the address words depends on the criteria selected when the sequence of the access operations to the data store is monitored. If the intention is to prevent read access operations from overtaking write access operations, for example, then the address words that belong to write access operations are selected. If only address words for write access operations are present in the address store in this case, then the selection involves all the address words in the address store.

The comparison results are entered in bit positions of a dependency vector, wherein each bit position is allocated to the identifier for the stored address word used in the respective individual comparison. The dependency vector produced is itself allocated the identifier for the new address word. The dependency vectors currently being processed are stored in a dependency vector store so that the similarities established in the comparison can be used for further processing. The similarities ultimately can be attributed to dependencies of the access operations characterized by the different identifiers. These involve time dependency when carrying out the access operations, the essence of this dependency being that the marked access operations absolutely must be completed beforehand.

A data phase being executed on the SP bus and allocated to an address by the identifier informs the control part that an access operation for this identifier has been completed. The control part subsequently deletes, in all dependency vectors, entries in the bit position allocated to this identifier. This means that, with the present invention, the correlations established in the comparison are matched to the instantaneous processing status as a result of the entries in the dependency vectors constantly being corrected.

The allocation of identifiers to address words and to the dependency vectors may be explicit or, as with the address words for example, may be achieved by always storing address words for a particular identifier at the same position in the address store. Similarly, identifiers may be allocated to dependency vectors in that each memory cell identifies the dependency vector which it contains when the dependency vectors are stored in a dependency vector store.

If, at least in the case of read access operations to the data store, a status signal is produced from the dependency vector whose identifier corresponds to the identifier for the address word for the respective read access operation, then it is possible for the access operation to the data store to be delayed until the status signal indicates that the relevant dependency vector contains no other entries. No entry means that there is no other dependency on other access operations which are to be carried out beforehand. Hence, the access operation can be carried out only if the criteria drawn up for the access sequence are met.

By virtue of the present invention, an address word is transmitted on the bus only once. If a conflict arises between different access operations, the access operation which is respectively last is delayed until the conflict has been resolved. Only then is the data word associated with the address word processed. In contrast to known methods, use of the bus is reduced because an access operation requires the address word to be transmitted only once. In addition, the processor that transmits the address word is relieved because repeated transmission of the address word is avoided.

Finally, the present invention provides an access-control method which, despite the delays produced, causes the speed of access to be increased because the delays produced are shorter than the time which would be required to repeat the access operation.

In another, the embodiment invention relates to a circuit which is particularly suited to carrying out the access-control method. The characteristics described also apply to this circuit accordingly.

Hence, the present invention relates to a dependency controller and method for overlapping memory access operations whose addresses carry an identifier, in which controller the addresses which have not yet been processed are stored under the identifier and a comparison of each new address with stored addresses is used to produce and store a bit vector whose bits are allocated to the identifiers and are deleted when the allocated memory access operation has been completed.

Additional features and advantages of the present invention are described in, and will be apparent from, the Detailed Description of the Preferred Embodiments and the Drawing.

FIG. 1 shows a block diagram of electronic units for accessing a data store in accordance with the present invention;

FIG. 2 shows the block diagram of an enable unit for enabling access operations to the data store; and FIG. 3 shows a status memory cell in the enable unit.

DETAILED DESCRIPTION OF THE PREFERRED EMBODIMENTS

FIG. 1 shows a block diagram of electronic units for accessing a data store 10 in a data processing unit. A number of processors (not shown) for the data processing unit are connected to an SP bus 12 which contains, amongst other things, lines for transmitting data, lines for transmitting addresses and lines for transmitting control signals.

The data lines in the SP bus 12 are electrically connected to a bidirectional data bus 14 which can be used to transmit data words between the SP bus 12 and a data buffer 16 in both directions of the data bus 14. The data buffer 16 stores data words transmitted via the SP bus until they are transmitted between the data buffer 16 and the data store 10 via a further bi-directional data bus 18. The data buffer 16 likewise stores data words read from the data store 10 if transmission on the SP bus 12 is not intended to take place until later. If separate write and read buffers are used, the data lines 14, 18 each may be of unidirectional design.

The address lines in the SP bus are connected to lines in a read address bus 20 and in a write address bus 22. The read address bus 20 is used to transmit address words from the SP bus 12 to a read memory 24, wherein these address words contain a read address for a memory cell in the data store 10. In this context, read address means that a data word is intended to be read from that memory cell whose address corresponds to the read address. To simplify the illustration, FIG. 1 shows only four memory cells 26 to 32 in the read memory 24. These store the address words transmitted successively on the read address bus 20, preferably in the manner of a data queue (FIFO, first-in-first-out), so that address words written first to the memory 24 are also read as first address words again at the output of the memory 24. The output of the memory 24 is connected to a further read address bus 34. In practice, the number of memory cells 26 to 32 in the memory 24 is greater than four and at most equal to the number of possible identifiers, because it is not yet possible for more read and write requests to be completed. In addition, if the complexity of the decision unit, for example, is raised accordingly, it is possible to use not FIFO memories but individually addressable memories which then can be used to mix up the sequence within the read and write requests; for example, to carry out two read access operations to the same address in direct succession on the data buffer 16. The memories for the addresses also hold the respective identifiers so that allocation to the dependency signals described further below can take place on the bus 66.

The write address bus 22 transmits address words from the SP bus to a write memory 36. The address words transmitted on the write address bus 22 contain write addresses, i.e. addresses in the data store 10, which address memory cells to which data words are to be written. The address words transmitted on the write address bus 22 are stored in four memory cells 38 to 44 in the write memory 36 on the basis of the FIFO principle. The output of the memory 36 is connected to a further write address bus 46 which transmits the address words supplied from the memory 36.

The read address bus 34 and the write address bus 46 are connected to a multiplexer unit 48 which is used to transmit, alternatively, address words with read addresses from the read address bus 34, or address words with write addresses from the write address bus 46, to a memory address bus 50 whose lines are electrically connected to the address lines of the data store 10.

The address words are read from the read memory 24 and from the write memory 36 under the control of a decision unit 52. A line 54 between the read memory 24 and the decision unit 52 is used to signal the decision unit 52 as to whether address words are held in the read memory 24. Accordingly, the decision unit 52 receives a signal, via a line 56 between the write memory 36 and the decision unit 52, indicating whether address words are held in the write memory 36.

On the basis of a predetermined strategy, the decision unit decides how the multiplexer unit 48 is to be driven, depending on the address words in the memories 24 and 36. One simple strategy would be, for example, for the address words to be processed in the read memory 24 as a priority. This means that the multiplexer unit 48 is driven via an output line 58 from the decision unit 52 in such a way that all the address words held in the read memory 24 are successively transmitted via the read address bus 34 and the memory address bus 50. Only if there are no other address words held in the read memory 24 are any address words held in the write memory 36 transmitted via the write address bus 46 and the memory address bus 50 to the data store 10. Other strategies preventing "starvation" which result in excessive disadvantages for write access operations as a result of a minimum quorum also can be used. In all cases, however, predefined criteria for the sequence of processing the address words in the memories 24 and 36 are taken into account in order to prevent the results from being distorted as opposed to those procedures [lacuna] on a computer with a conventional, non-SP bus. Currently existing dependencies are recognized with the aid of an enable unit 60 whose input side is connected to the address lines in the SP bus 12 via an address bus 62. The address bus 62 transmits address words from the SP bus 12 to the enable unit 60.

In addition, the enable unit 60 is connected to the control lines in the SP bus 12 via a control bus 64. As described below with reference to FIG. 2, the enable unit 60 uses identifiers, which are transmitted via the control bus 64 for the enable unit, to update existing dependencies between the access operations to the data store 10 which are currently being processed. The enable unit 60 signals the currently existing dependencies to the decision unit 52 via a bus 66, so that they can be taken into account by the decision unit when implementing the specified strategy.

The circuit shown in FIG. 1 makes it possible to process access operations to the data store 10 which are subdivided into a number of access procedures. The different phases of an access operation can be determined unambiguously by means of an identifier allocated to the respective access operation and its phases. The enable unit 60 ensures that, despite specified requirements concerning the sequence of processing for the different procedures on the SP bus 12 being met, no access operations are rejected. If conflicts arise, the reading of address words from the read memory 24 or from the write memory 36 is delayed until the conflict is removed as a result of other procedures, such as the reading of address words from the respectively other memory 24 or 36.

FIG. 2 shows a block diagram of the enable unit 60, which contains an address buffer unit 100, a comparison unit 102, a status memory 104 and an evaluation unit 106. Furthermore, the enable unit 60 contains a controller (not shown) which produces control signals, for example, depending on the identifiers K0 to Kn, where n is a natural number; for example, seven.

The address buffer unit 100 contains as many address buffers as identifiers in order to provide each transaction started via an address phase but not completed by a data transfer with a storage location for the relevant address of these address buffers, FIG. 2 shows an address buffer 108 for storing an address word with the identifier K0 and an address buffer 110 for storing an address word with the identifier K7. The address buffers 108, 110 in the address buffer unit 100 each have their inputs connected to all the lines in the address bus 62. Furthermore, a respective signal line is connected to each of the address buffers 108 to 110 of these signal lines, FIG. 2 shows the signal line 112 at the input of the address buffer 108 and the signal line 114 at the input of the address buffer 110. If one of the signal lines 112, 114 carries a signal "H", then the address word currently present on the address bus 62 is transferred to the respective address buffer 108, 110. To this end, a synchronous clock signal (not shown) also can be used. This also is not mentioned below, but can be used with all the enable signals. The signal "H" is produced on the signal line 112 as soon as the address bus 62 carries an address word which is allocated the identifier K0. In contrast, the signal value "H" is produced on the signal line 114 as soon as the address bus 62 carries an address word which is allocated the identifier K7. Hence, the address buffer unit 100 is an address buffer which is addressed by the identifier. At the same time as the respective address word is transferred to one of the address buffers 108, 110, the higher-level controller notes, inter alia in an indicator 116, 118 allocated to the respective address buffer 108, 110, whether the address word contains a read address or a write address. For the sake of clarity, the processing of this information is not illustrated in detail to start with, but is explained in more precise terms further below.

The address buffers 108, 110 are each connected, by means of lines which are combined to form a bus 120, 122, to the inputs of comparator modules 124, 126 contained in the comparison unit 102. Hence, the bus 120 connects the address buffer 108 to the comparator module 124. The address buffer 110 is connected to the comparison module 126 via the bus 122.

Each comparison module 124, 126 in the comparison unit 102 has a further input which is respectively connected to the address bus 62. The comparison modules 124 to 126 each compare the address words at their inputs and output signal values on their output lines 128, 130 depending on the comparison result. This produces a dependency vector with as many positions as identifiers, which in the simple case described hitherto stores binary values; namely, whether there is any coincidence with earlier access operations to the same address.

The output lines 128, 130 are combined to form a bus 132 which is connected to inputs of status memory cells 134, 136 in a status memory 104. In addition, further inputs of all the status memory cells 134, 136 are connected to the control bus 64. The higher-level controller uses signal lines 138, 140 to select those status memory cells 134, 136 which are allocated the identifier for the address phase that is active on the bus 132. Thus, the status memory cell 134 is activated via the signal line 138 if the address bus 62 carries an address word having the identifier K0, which is compared with selected address words from the address buffer unit 100 in the comparison unit 102. The status memory cell 134 then stores a dependency vector for the identifier K0. The status memory cell 136 is actively loaded (or written to) via the signal line 140 if an address word having the identifier K7 is used on the address bus 62 as a basis for comparison in the comparison unit 102. In this case, the comparison result is stored on the bus 132 as a dependency vector in the status cell 136 for the identifier K7. The structure of the status memory cells 134, 136 is explained in more detail below with reference to FIG. 3.

This forms a square dependency matrix whose positions indicate whether there is any coincidence with other transactions having the same address. The diagonal of this matrix is always stored as unoccupied, in that the appropriate inputs, for example, are not connected to the corresponding lines in the bus 132 for the dependency vectors. This technique can be applied if the status memories used are arranged as modules in an application-specific circuit (ASIC) or as integrated circuits on a conventional printed circuit board. Alternatively, if more convenient, the memory cells also can be dispensed with completely and their outputs replaced by a fixed logic signal. This is because the memory access operations for one identifier never collide with themselves. Depending on the instant at which the address for the current address phase is stored in the associated address buffer and appears at the output, the output signal from the comparator allocated to this identifier would vary. In addition, the deleted diagonal simplifies the evaluation described below by means of an OR function.

For evaluation purposes, each status memory cell 134, 136 has its output connected to a bus. Of these, FIG. 2 shows a bus 142 at the output of the status memory cell 134 and a bus 144 at the output of the status memory cell 136. The bus 142 is used to transmit the status data word for the identifier K0 from the status memory cell 134 to an OR circuit 146, which provides a logic combination for the signals on the lines in the bus 142 based on the logic OR function. The result of the logic combination is output at the output of the OR circuit 146 on a line 148 in the bus 66. The bus 144 transmits the current status data word for the identifier K7 from the status memory cell 136 to a further OR circuit 150 in the evaluation unit 106, which works like the OR circuit 146. The output of the OR circuit 150 is connected to a line 152 in the bus 66.

This bus 66 is connected to the decision unit 52 and indicates which transactions cannot yet be carried out because they are in conflict with earlier transactions. The OR functions 146, 150 are, therefore, part of the decision unit in terms of their logic structure but, in terms of the circuitry, are better arranged close to the status memories 134, 136 in order to keep the connections short.

If the enable unit 60 is used, for example, to prevent read access operations to the data store 10 from overtaking write access operations to the data store 10, then the method of operation is as follows. Each address word, on the address bus 62, relevant to the access operation to the data store 10 is stored, on the basis of its identifier K0 to K7, in the associated address buffer 108, 110. At the same time, it is compared in the comparison unit 102 with the address words which are already stored in the address buffer unit 100 and contain the write addresses.

The comparison result produced for the address word transmitted respectively last on the address bus 62 is a dependency vector at the output of the comparison unit 102. The dependency vector is stored in that status memory cell 134, 136 allocated to the identifier K0 to K7, which identifier is also allocated to the address word currently being transmitted on the address bus 62. In the dependency vector, each bit position is allocated to the identifier for that address word from the address buffer unit 100 which is used for the respective individual comparison. The output line 128 transmits the value of the first bit position of the dependency vector produced, the first bit position being allocated the identifier K0. In contrast, the output line 130 transmits the value of the last bit position of the dependency vector produced, this bit position being allocated the identifier K7.

The dependency vectors in the status memory cells 134, 136 are changed if the signals on the control bus 64 show that an access operation to the data store 10 (cf. FIG. 1) has been completed for one of the identifiers K0 to K7. As also explained in more detail further below with reference to FIG. 3, all the bit positions in the status memory cells 134, 136 are deleted which are allocated to the identifier for the address word whose processing has been completed.

Not until all the bit positions of one of the dependency vectors have been deleted is a signal produced, based on the OR function, in the evaluation unit 106 for the identifier K0 to K7 for the respective dependency vector. This signal indicates to the decision unit 52 that the access operation to the data store 10 which has the corresponding identifier can be carried out. On the other hand, the decision unit 52 (cf. FIG. 1) delays the reading of address words from the read memory 24 until the enable unit 60 uses the identifier associated with this address word to signal that access to the data store 10 is permissible.

FIG. 3 shows the structure of the status memory cell 134 which, for eight possible identifiers, also contains eight D-type flip-flops. Of these, FIG. 3 shows the flip-flop 200 and the flip-flop 202. Each of the flip-flops 200, 202 in the status memory cell 134 stores precisely one of the bit positions of the dependency vector for the identifier K0. Thus, flip-flop 200 stores the first bit position $2^0$ and flip-flop 202 stores the last bit position $2^7$.

The signal line 138 is connected to one input of each flip-flop 200, 202, this input receiving the signal value "H" when a valid address word having the identifier K0 is present as a basis for comparison on the address bus 62 (cf. FIG. 2), and thus effecting a transfer, possibly by means of a clock signal (not shown). If the flip-flops 200, 202 are activated via the signal line 138, then the comparison result contained in the dependency vector on the bus 132 is transferred bit by bit to the flip-flops 200, 202 in the status memory cell 134.

The current values of the bit positions of the dependency vector having the identifier K0 are output at the outputs Q of the flip-flops 200, 202 on output lines 204, 206 in the bus 142. If the control bus 64 signals that an access operation for one of the identifiers K0 to K7 has been completed, then a correction is made in the dependency vector having the identifier K0. In this context, the flip-flop 200, 202 is reset to the numerical value "0" using its reset input R, the flip-flop being allocated to the identifier K0 to K7 for which the completion of the access operation is signaled. Hence, flip-flop 200 is reset via a line 208 in the control bus 64 if an access operation having the identifier K0 has been completed. Flip-flop 202 is reset via a line 210 in the control bus 64 if an access operation having the identifier K7 has been completed.

The address buffers 108, 110 also can, as mentioned above, store an indicator 116, 118 for the type of access, particularly for differentiating between a read and a write access operation. This indicator either can be run past the comparator and be entered in the dependency vector, which then contains three values coded by two bits, for each identifier. These values then indicate whether the conflict relates to an earlier read or write access operation. As the decision unit already knows the type of access operation for each transaction that remains open, storage in the dependency vector is not necessary. This then makes it necessary to provide an even more complex function than a simple OR function 146, 150 for the evaluation. In addition to the access conflicts illustrated in the following text, it is then possible to recognize write operations following write operations and to suppress the older write operations, for example, if there are no read operations.

Alternatively, the comparators 124, 126 are designed such that they take into account not only the address but also the indicator. In this respect, the comparator then should be designed such that the coincidence between one read operation and another read operation does not become effective; that is to say, is treated as a different address. If a read operation encounters an earlier write operation, then there is a conflict and the output is set. If a write operation encounters an earlier read operation, then there is similarly a conflict, wherein the read operation initially needs to supply the earlier data. The same applies for two successive write operations which have to be processed in sequence so that the final data are stored.

Besides read and write operations, other operations also are naturally possible if they are defined in the system. These include synchronization operations, for example, which are produced as memory semaphores. It is also conceivable for the SP bus 12 to support test operations which signal the presence or other characteristics of a memory cell. It is also possible to have read operations which can be executed asynchronously; that is to say, carried out after subsequent write operations. It is also possible to have read operations which are designed to be aborted if they collide with a subsequent write operation, instead of the subsequent write operation possibly being designed to be aborted if it cannot be postponed.

In order to save storage space, the memories 108, 110 for the addresses also can be narrower than the address bus if larger blocks are used for the dependency than the data quantity respectively used for a memory access operation. However, this then results in a read access operation possibly being delayed for a block specified in this way, although the memory access operation that has not yet been completed concerns merely an adjacent memory position which is located in the same block but is not exactly the same. As the saving is small, this variant preferably is used when the storage elements with a small number of bits are conveniently present or the indicators 116, 118 for the type of access operation are produced as a result of storage in the least-significant position of the address buffer.

If, as mentioned above, the address stores 24, 26 are designed as random access memories, which are then expediently addressed by the identifier, the enable unit can use the address stores 24, 26 in parallel instead of dedicated address buffers 108, 110. In this case, the saving on an address buffer is achieved in return for a corresponding number of additional connections.

Although the present invention has been described with reference to specific embodiments, those of skill in the art will recognize that changes may be made thereto without departing from the spirit and scope of the invention as set forth in the hereafter appended claims.

What is claimed is:

1. A method of controlling access to memory cells of a data store via a bus system, which uses separate address and data phases allocated to one another by a common identifier, the method comprising the steps of:

addressing an address buffer using the common identifier;

storing, via the address buffer, addresses last used for a respective identifier;

comparing a relevant address with addresses stored in the address buffer during an address phase;

forming a dependency vector based on the step of comparing, the dependency vector having positions which correspond to the identifiers and which contain a comparison result, the dependency vector further being stored in a status memory of a status matrix wherein the status memory is addressed by the common identifier;

evaluating the stored dependency vectors allocated to the identifiers using a decision unit;

determining via the decision unit whether there is any dependency in relation to earlier memory access operations;

storing the respective address in the address buffer allocated to the respective identifier in the course of the address phase; and deleting those elements in the stored dependency vectors that correspond to the common identifier for the data phase upon completion of the data phase.

2. A method of controlling access to memory cells of a data store via a bus system as claimed in claim 1, further comprising the step of:

storing an indicator, using the address buffer, simultaneously with the step of storing the respective address, wherein the indicator specifies a type of access.

3. A method of controlling access to memory cells of a data store via a bus system as claimed in claim 1, wherein the dependency vectors are evaluated by ORing.

4. A circuit for controlling access to memory cells of a data store via a bus system, which uses separate address and data phases allocated to one another by a common identifier, the circuit comprising:

an address buffer connected to the address bus by its data inputs and connected to the common identifier by its address;

a comparator connected to outputs of the address buffer and to the address bus;

status memories addressed by the common identifier;

a dependency vector formed from outputs of the comparator, the outputs of the comparator being respectively connected to inputs of the status memories;

a decision unit connected to outputs of the status memories via an evaluation function; and a processing logic unit connecting delete inputs of memory cells in the status memories to the control bus, wherein an end of the data phase deletes those positions in each of the status memories that are allocated to the common identifier.

5. A circuit for controlling access to memory cells of a data store via a bus system as claimed in claim 4, wherein an indicator which specifies a type of access is stored along with addresses in the address buffer.

6. A circuit for controlling access to memory cells of a data store via a bus system as claimed in claim 4, wherein the evaluation function is an OR function.

7. A circuit for controlling access to memory cells of a data store via a bus system as claimed in claim 4, wherein an address store required for data access is simultaneously used as the address buffer.

* * * * *